United States Patent
Cansler et al.

(10) Patent No.: US 8,566,158 B2
(45) Date of Patent: Oct. 22, 2013

(54) SYSTEM AND METHOD FOR HARVESTING ADVERTISING DATA FOR DYNAMIC PLACEMENT INTO END USER DATA STREAMS

(75) Inventors: James L. Cansler, Cedar Park, TX (US); Charles Scott, Austin, TX (US); Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1055 days.

(21) Appl. No.: 12/020,642

(22) Filed: Jan. 28, 2008

(65) Prior Publication Data

US 2009/0193453 A1    Jul. 30, 2009

(51) Int. Cl.
*G06Q 30/00*    (2012.01)
*G05B 19/418*   (2006.01)

(52) U.S. Cl.
USPC .............. 705/14.49; 705/1.1; 725/61; 725/32

(58) Field of Classification Search
USPC ...................................... 725/32; 705/1, 14.49
See application file for complete search history.

(56) References Cited

U.S. PATENT DOCUMENTS

| | | |
|---|---|---|
| 2,829,030 A | 4/1958 | Habernickel |
| 3,021,944 A | 2/1962 | Moore |
| 3,143,248 A | 8/1964 | Branda |
| 3,206,135 A | 9/1965 | Uncapher |
| 3,228,726 A | 1/1966 | Petersen |
| 3,345,466 A | 10/1967 | Rahmig |
| 6,704,930 B1 * | 3/2004 | Eldering et al. ................. 725/36 |
| 2005/0027827 A1 * | 2/2005 | Owhadi et al. ................. 709/219 |
| 2005/0055231 A1 * | 3/2005 | Lee ................................... 705/1 |
| 2005/0155067 A1 * | 7/2005 | McKenna, Jr. .................. 725/61 |
| 2008/0152097 A1 * | 6/2008 | Kent ........................... 379/93.01 |
| 2008/0271070 A1 * | 10/2008 | Kanojia et al. .................. 725/32 |

OTHER PUBLICATIONS

Digital choice: YouTube InVideo ads. Marketing , 12. Sep. 5, 2007.*

* cited by examiner

*Primary Examiner* — Victoria Vanderhorst
(74) *Attorney, Agent, or Firm* — G. Michael Roebuck

(57) ABSTRACT

A method is disclosed for selecting advertising data at an end user device, the method comprising monitoring a plurality of advertising data items in a first video data stream at the end user device; correlating advertising characterization data for the advertising data item with end user profile data for an end user at the end user device; and selecting based on the correlating at least one of the plurality of advertising data items for presentation during display of a second video data stream at the end user device. A system is disclosed for performing the method. A data structure is disclosed for containing data used by the system and method.

20 Claims, 4 Drawing Sheets

SYSTEM AND METHOD FOR HARVESTING ADVERTISING DATA FOR DYNAMIC PLACEMENT INTO END USER DATA STREAMS

FIELD OF THE DISCLOSURE

The present disclosure relates to the field of targeted advertising.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television TV, special or pay-per-view programming, video on demand (VOD), and other content choices available to subscribers. Television advertisers now target advertisements based on regions in which the television signal is delivered. For example, viewers in a New York state region will receive different advertising data than viewers in a Texas state region.

DETAILED DESCRIPTION

Figure 1:
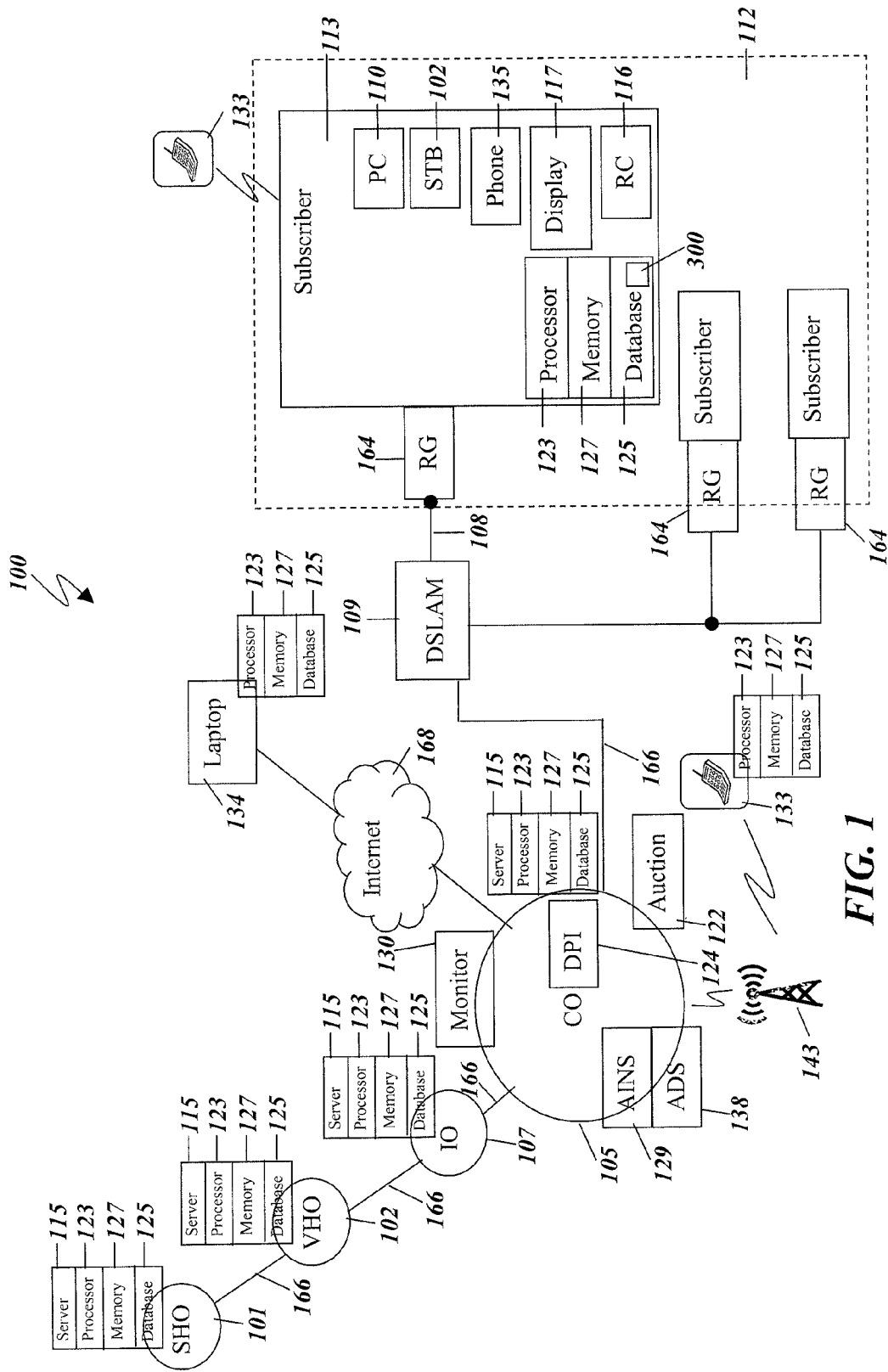
FIG. 1 depicts an illustrative embodiment of a system for harvesting and presenting advertising data.

Illustrative embodiments are disclosed including but not limited to a system and method by which an end user device, such as a set-top box (STB) or digital video recorder (DVR) utilizes one or more methods or systems to harvest advertising data from television channels while the STB or DVR is idle, that is not presenting a video data stream. In an illustrative embodiment, the STB, DVR or another end user device analyzes video and audio broadcast programs for the presence of advertisements or advertising data items based on a monitoring script. An illustrative embodiment copies certain advertising data and advertising characterization data from a monitored video stream to a database in the STB's or DVR's local storage.

The advertising characterization data is generated based on an analysis of the advertising data contained in the video data stream. An appropriate advertising data item is selected from the stored advertising data based on a correlation between the video program data (i.e., movie or television program) currently being presented to an end user, an end user profile for the end user and the advertising characterization data. The stored advertising data is analyzed through video, image, textual and aural analysis and categorized as to advertising characterization data and stored as the "harvested" advertising data in the database at the end user device. These harvested advertising data are then available in a data base to be selected and used for dynamic advertising data insertion purposes.

An illustrative embodiment utilizes idle time for an end user device, such as an STB to harvest advertising data items (also referred to herein as "advertisements") from a broadcast video data stream received at the end user device. The harvested advertising data provides a rapid ability to build a substantial, timely library of advertising data for dynamic placement. An illustrative embodiment takes advantage of the large amount of time the STB or another end user device is idle. During these times, the end user device or STB is monitoring or 'watching TV' and recording commercials or advertising data broadcast in the video signal that is being watched. A monitoring script contains monitoring script data that directs the end user device, such as an STB, as to which programs or video data streams to watch or monitor and when to watch the video data streams for harvesting advertising data from the video data streams being watched. The monitoring script contains data indicating logic stored locally on the device, on a back-end management system, or on a recommendations platform that guides the STB in choosing which networks, video multicasts, time slots and/or programs to 'watch'. Advertising data can be identified by a number of means including but not limited to a discrete identifier within the advertising data, key frames or black frames, speech-to-text analysis, closed captioning data, and so on. When applicable advertising data are identified, they are copied to the STB's local storage (hard drive or similar) and categorized by correlative index. A correlative index is formed for each harvested advertising data item by correlating advertising characterization data, video characterization data for the currently actively view program and end user profile data for the end user.

The locally stored advertising data can then be utilized for dynamic advertising placement systems—i.e., played before a video on demand (VoD) presentation, substituted over a broadcast commercial into a video data stream, inserted by one of the advertising data-insertion devices provided in an illustrative embodiment or inserted by the end user device during the presentation of a currently viewed program. After a harvested advertising data item has achieved a certain 'flight' or number of presentations at a predetermined number of end user devices, the presented harvested advertising data can be discarded to make room for recording of additional harvested advertising data. For example, if an advertiser wants to achieve a maximum of 10,000 advertising impressions, that is, wants present a particular advertising data item no more than 10,000 times at end user devices, the advertising data item is removed from the data base of all end user devices after being presented 10,000 times at end user devices. The maximum number of impressions (10,000) can be a cumulative number of impressions achieved during original broadcast of an advertising data item plus after broadcast harvested presentations of the advertising data item. An identifying data element is embedded in each advertising data item so that a backchannel-equipped end user device, for example, STBs submit periodic statistics data to a back-end system, such as an internet protocol television (IPTV) system.

In an illustrative embodiment the IPTV system delivers the advertising data reports to the IPTV system SHO, network or advertiser for additional presentations or advertising impressions (e.g., an IPTV system can add 10,000 additional views or impressions of a particular advertising data item such as advertising data item X via dynamic insertion of harvested copies of advertising data item X, at end user devices in addition to advertising impressions achieved with the broadcast flight or broadcast presentation of advertising data item X).

In an illustrative embodiment, a computer readable medium is provided containing computer instructions that when executed by a computer perform a method for selecting advertising data at an end user device comprising monitoring a plurality of advertising data items in a first video data stream at the end user device; correlating advertising characterization data for the advertising data item with end user profile data for an end user at the end user device; and selecting based on the correlating at least one of the plurality of advertising data items for presentation during display of a second video data stream at the end user device. In another embodiment of the medium, the first video stream further comprises a plurality of video channels data received from an internet protocol television (IPTV) system.

In another embodiment of the medium, the method further includes correlating the advertising characterization data for harvested advertising data, end user profile data for the current end user and video characterization data for the second video data stream. The advertising data items are categorized by a correlative index based on the correlating and stored in a data base at the end user device. In another embodiment of the medium, the monitoring further includes monitoring video channels at prescribed times defined in a monitoring script at the end user device. In another embodiment of the medium, the end user device is a device selected from the group consisting of a set top box a mobile phone, a personal computer and a digital video recorder. In another embodiment of the medium, the advertising characterization data are selected from the group consisting of a discrete identifier, key frames, black frames, speech to text analysis, closed captioning data image data, video data and subsonic audio data. In another embodiment of the medium, the advertising data item is removed from the data base at the end user device after being presented at a predetermined number of end user devices. In another embodiment of the medium, the method further includes reporting from the end user device selection of the advertising data for display.

In another embodiment a system is disclosed for selecting advertising data at an end user device including but not limited to a processor in data communication with a computer readable memory; and a computer program stored in the computer readable medium, the computer program comprising instructions to monitor a plurality of advertising data items in a first video data stream at the end user device; instructions to correlate advertising characterization data for the advertising data item with end user profile data for an end user at the end user device; and instructions to select based on the correlating at least one of the plurality of advertising data items for presentation during display of a second video data stream at the end user device. In another embodiment of the system the first video stream further comprises a plurality of video channels data received from an IPTV system.

In another embodiment of the system, the computer program further includes instructions to correlate the advertising characterization data, end user profile and video characterization data for the second video data stream wherein the advertising data items are categorized by a correlative index based on the correlating and stored in a data base at the end user device. In another embodiment of the system, the instructions to monitor further comprise instructions to monitor IPTV video channels at prescribed times defined in monitoring script data at the end user device. In another embodiment of the system the end user device is a device selected from the group consisting of a set top box, a mobile phone, a personal computer and a digital video recorder. In another embodiment of the system, the advertising characterization data selected from the group consisting of a discrete identifier, key frames, black frames, speech to text analysis, closed captioning data image data, video data and subsonic audio data. In embodiment of the system, the advertising data item is removed from the data base at the end user device after being selected for presentation at a predetermined number of end user devices. In another embodiment of the system, the computer program further includes instructions to report from the end user device selection of the advertising data for display.

In another embodiment, a data structure is disclosed embedded in a computer readable medium, the data structure including but not limited to a first field for storing data indicative of harvested advertising data monitored and copied from a first video data stream a plurality of advertising data items in a first video data stream at an end user device; a second field for storing data indicative of a correlation index based on correlating advertising characterization data for the advertising data item with end user profile data for an end user at the end user device; and a third field for storing data indicative of an advertising data item selected based on the correlation index for at least one of the plurality of advertising data items for presentation during display of a second video data stream at the end user device. In another embodiment, the data structure further includes but is not limited to a fourth field for storing data indicative of advertising characterization data describing the harvested advertising data. In another embodiment, the data structure further includes but is not limited to a fifth field for storing data indicative of video characterization data for a presently presented video; and a sixth field for storing data indicative of an end user profile. In another embodiment, the data structure further includes but is not limited to a seventh field for containing data indicating a correlative index for a correlation between the advertising characterization data, the video characterization data and the end user profile data.

Turning now to FIG. 1, FIG. 1 depicts an illustrative embodiment of a system for automatically selecting advertising data for a subscriber based on content of video and other data stored at end user devices in an IPTV system. The IPTV system provides IPTV video data, VoIP data and Internet data services to end user devices. The IPTV system provides IPTV video, high speed internet video and other data from high speed internet and VoIP data and video. The video can be video data including but not limited to television programming, movies, and video on demand in which Meta data describing the video data may be supplied; or video data without associated Meta data for subscriber created videos such as video data provided on popular Internet sites such as My Space™ and You Tube™. Meta data for movies and television programs include title and description for the video. In an illustrative embodiment, video characterization data is generated at the end user device or upstream in the IPTV system by processing the video data using image recognition, speech to text recognition, character recognition and meta data for the video to characterize the video data stream that is being watched or is scheduled to be watched at an end user device.

In an illustrative embodiment, the IPTV system builds subscriber or end user profile data for IPTV end users devices by aggregating and correlating subscriber related statistics and subscriber activity data along with other subscriber data and demographic information such as gender, age, income, languages spoken, areas of interest, etc. for IPTV subscribers of other end users associated with the end user devices. Some of the subscriber profile data can be volunteered by an IPTV subscriber during an IPTV registration process. In another particular embodiment, the subscriber profile data further contains data for which a subscriber has opted in for monitoring and use by an IPTV system for the purposes of automatically receiving targeted advertising data. Subscriber preferences for particular advertising classes of current viewers can be estimated from data included in the subscriber profile, including but not limited to device type, subscriber type, and device state based on the subscriber activity data.

Based on subscribers' interests, background, and subscriber profiling results, purchases, locations visited, demographics and subscriber activity data, advertising data selection and presentation methods and systems described herein or an equivalent thereof can be utilized to estimate an auction price and select targeted advertising for content stored at an end user device. Targeted advertising data is automatically selected and made available to personalize advertising data and television commercial delivery to IPTV television displays, portable subscriber data and messaging devices such as mobile or cell phones and video, website banners and pop up displays on a PC or mobile Laptop computer. Harvested advertising data is also automatically selected and made available to personalize advertising data and television commercial delivery to IPTV television displays, portable subscriber data and messaging devices such as mobile or cell phones and video, website banners and pop up displays on a PC or mobile Laptop computer.

As shown in FIG. 1, in an illustrative embodiment an IPTV system 100 delivers video content data and advertising data to subscriber house holds 113 and associated end user devices (also referred to herein as subscriber devices) which may be inside or outside of the household. Television advertising data is inserted or marked as available by the advertising server 138. In the IPTV system, IPTV video data are broadcast in an internet protocol (IP) format from a server at a super hub office (SHO) 101 to a regional or local IPTV video hub office (VHO) server 103, to a central office (CO) server 105 and intermediate office (IO) 107. The IPTV system 100 includes a hierarchically arranged network of servers wherein the SHO transmits video and advertising data to a video hub office (VHO) 103 and the VHO transmits to an IPTV server location close to a subscriber, such as a CO server 105 or IO 107. In another particular embodiment, each of the SHO, VHO, CO, and IO is interconnected with an IPTV transport 166. In a particular embodiment, the IPTV transport 166 consists of but is not limited to high speed fiber optic cables interconnected with routers for transmission of internet protocol data. The IPTV servers also provide data communication for data and video associated with Internet and VoIP services to subscribers. End users can access the Internet 168 and cell phone system 143 via the IPTV system.

Actively viewed IPTV channels are sent to end user devices in an IP data multicast group to access nodes such as digital subscriber line access multiplexers (DSLAMS) 109. A multicast for a particular IPTV channel is joined over a DSL line 108 from the DSLAM by an end user device, such as the set-top boxes (STBs) at IPTV subscriber homes. Each STB includes processor 123, a memory 127, and a database 125. Each SHO, VHO, CO and IO includes a server 115, processor 123, a memory 127, and a database 125. The processor 123 further includes a network interface. The processor reads computer programs containing executable instructions from a computer readable medium such as memory 127. The network interface functions to send and receive data over the IPTV transport 166 and DSL line 108. The CO server delivers IPTV, Internet and VoIP video content and data to the subscriber via the DSLAM. The television, internet and VoIP data and content can be delivered via multicast and unicast television advertising depending on a single subscriber or a targeted television advertising group of end user client subscriber devices to which the advertising data is directed.

In another particular embodiment, subscriber devices, including but not limited to, wire line phones 135, portable phones 133, mobile computer 134 personal computers (PC) 110 and STB 102 communicate with a communication system, e.g., IPTV system through residential gateway (RG) 164 and high speed communication lines 108 and 166. In another particular embodiment, deep packet inspection (DPI) device 124 inspects VoIP, Internet and IPTV video data, computer data, commands and Meta data transmitted between the subscriber devices (subscriber activity data) and the IPTV system servers. In another illustrative embodiment subscriber activity data are monitored and collected whether or not the subscriber's devices are in the household 113 or traveling as mobile devices outside of the household. When outside of the household, subscriber mobile device activity data and transactions data are monitored by a communication network (e.g., IPTV system) servers or nodes which associate the subscriber activity data with particular subscriber's end user devices. In another particular embodiment, subscriber activity data such as communication and purchase transactions are inspected by DPI devices located in a communication system, e.g., IPTV system servers. These communication system servers route the subscriber activity data to an IPTV server such as the CO in which the subscriber activity data for a subscriber are stored for processing. While an IPTV system has been used as an example in the illustrative embodiment, the disclosure is not meant to be limited to IPTV as other communication systems such as cable television or other digital and analog data delivery systems can be used in other embodiments.

In another particular embodiment, the end user subscriber devices further include but are not limited to a client user computer, a personal computer (PC), a tablet PC, a set-top box (STB), a Personal Digital Assistant (PDA), a cellular telephone, a mobile device, a palm computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data, including but not limited to VoIP video and data, Internet video and data and IPTV video and data, commands and Meta data between the subscriber end user devices and the IPTV system servers and the Internet.

In another illustrative subscriber activity data are monitored and collected whether or not the subscriber devices are in the household 113 or the devices are mobile devices connected via cellular network or WiFi outside of the household. When outside of the household, subscriber mobile device data are monitored by communication system servers (e.g., IPTV system) which associate the subscriber activity data with each particular subscriber's end user device. In another particular embodiment, subscriber activity data such as IPTV and Internet video selections, and communication and purchase transactions are inspected by DPI devices located in a communication system, e.g., IPTV system servers. These communication system servers route the subscriber activity data to a CO in which the subscriber activity data for a subscriber are stored for processing and become part of the historical behavior profile for the end user.

As shown in FIG. 1 advertising sub groups 112 (comprising a group of subscriber house holds 113) receive multicast video and advertising data at STB 102 in a video data stream from CO server 107 and DSLAM 109. Individual households 113 receive advertising data at set top box 102 or one of the other subscriber devices. More than one STB 102 can be located in an individual household 113 and each individual STB can receive a separate multicast or unicast advertising stream on IPTV transport 166. In another particular illustrative embodiment, separate and unique advertising data are sent to each set top box (STB) 102 tailored to target the particular subscriber watching television at that particular STB. Each STB 102 has an associated remote control (RC) 116 and video display 117. The subscriber via the RC selects channels for a video data viewing selection (video programs, games, movies, video on demand) and places orders for products and services over the IPTV system 100.

FIG. 1 depicts an illustrative communication system, including but not limited to a television advertising insertion system wherein television advertising data can be inserted at an IPTV server (SHO, VHO, CO, IO) for delivery to an end user device, for example, an STB, mobile phone, web browser or personal computer. Advertising data can be inserted into or made available during replay of IPTV or other video data stored at an end user device. The advertising data is delivered via advertising insertion device 129 located at the IPTV CO server or at one of the end user devices such as the STB 102 or other end user device which inserts the advertising data into video data. The IPTV servers include an advertising server (AINS) 129 and an advertising database (ADS) 138. The advertising data is selected by advertising selection element 129 from the harvested advertising database 138 based on an auction for an available advertising spot based on a subscriber profile and delivered by the VHO advertising server 138. An SHO 101 distributes data to a regional VHO 103 which distributes data to local COs 105 which distributes data to a digital subscriber access line access multiplexer (DSLAM) access node to subscriber devices such as STB 102, PC 110, wire line phone 135, mobile phone 133, etc. Advertising data is also selected based on the subscriber profile and sent to a mobile phone or computer associated with the subscriber. The subscriber profile is built based on a subscriber's IPTV, Internet and VoIP activity. The targeted advertisements and other advertising data that are embedded in the incoming video data stream to an end user device are harvested at the end user device. The harvested advertising data are then presented in other video data after the original broadcast.

Figure 2:
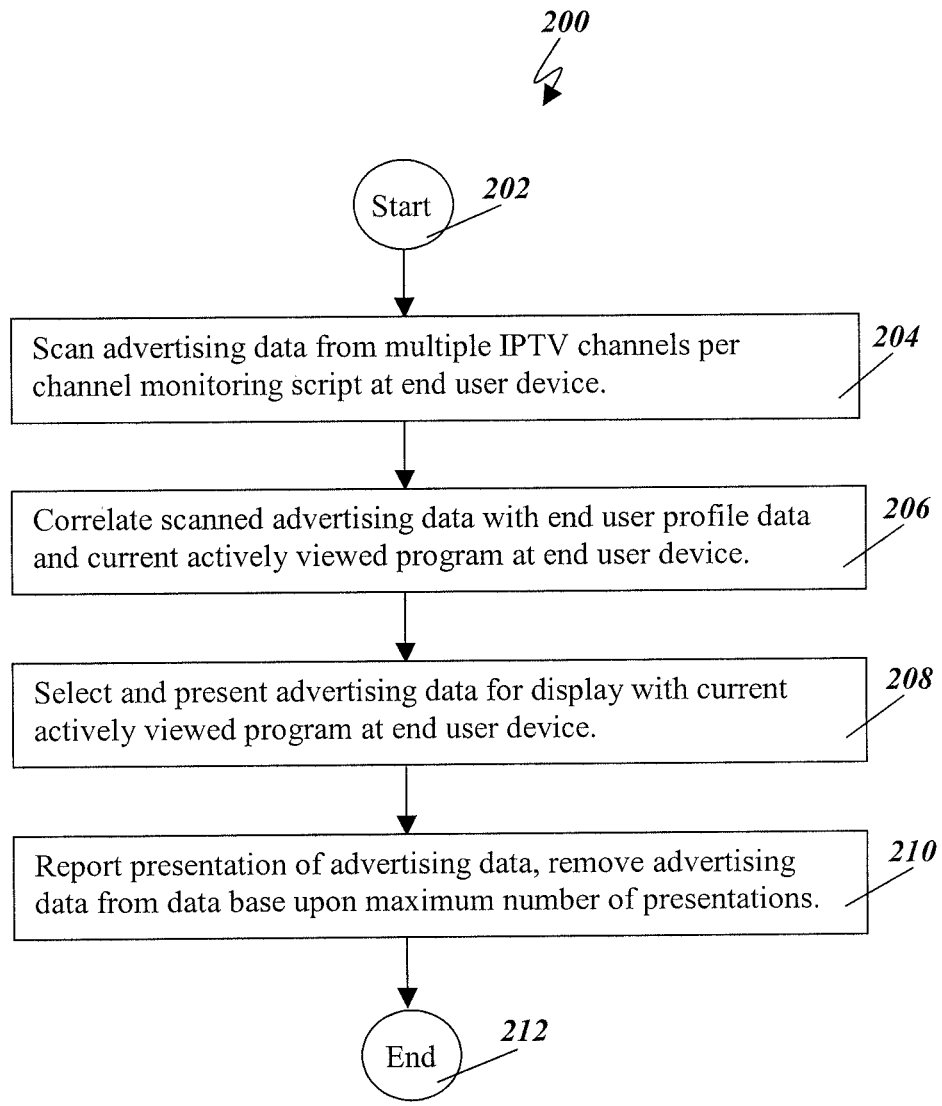
FIG. 2 depicts a flow chart of functions performed in an illustrative method for harvesting and presenting advertising data.

Moving now to FIG. 2, in an illustrative embodiment a flowchart 200 of functions is performed as shown in FIG. 2. The order of execution of functions performed in additional embodiments is not dictated by any flow chart in this disclosure, as in other embodiments any function can be executed in any order in relation to other functions or left out of execution altogether. An illustrative embodiment starts at terminal 202 and proceeds to block 204. At block 204 an illustrative embodiment scans or monitors advertising data from the multiple IPTV channels according to channel monitoring script data at the end user device. In an illustrative embodiment, the method then proceeds to block 206 when an illustrative embodiment correlates the scanned advertising data with end user profile data and currently active view program data at the end user device. In an illustrative embodiment, the method then proceeds to block 208 and selects advertising data for presentation with the currently actively viewed program at the end user device. In an illustrative embodiment, the method then proceeds to block 210 and reports presentation of the selected advertising data, and removes the advertising data from the data base upon presentation of a maximum number of times or advertising impressions at end user devices in the IPTV system.

Figure 3:
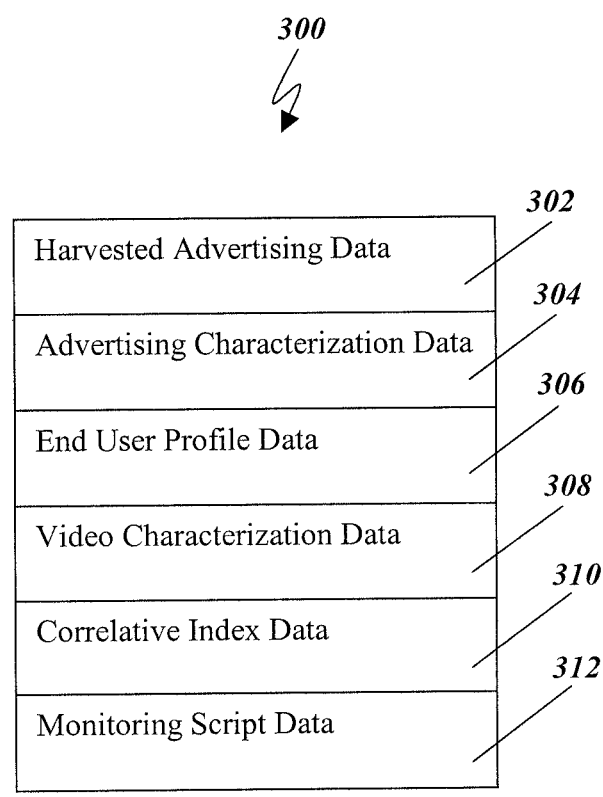
FIG. 3 depicts a data structure embedded in a computer readable medium that is used by a processor and method for harvesting and presenting advertising data.

Turning now to FIG. 3, a data structure 300 embedded in a computer readable medium is disclosed. In an illustrative embodiment, the data structure provides a first data structure field 302 for containing data indicative of advertising data stored in a data base at an end user device. The advertising data is scanned from a first video data stream, such as a television channel, such as an IPTV video data stream. In another embodiment, the advertising data can also be scanned from the Internet, a cable television signal, an analog television signal or a satellite television signal. The advertising data is presented at the end user device during a presentation of a second video data stream. In another illustrative embodiment, the advertising data is presented at a mobile end user device such as a cellular or WiFi mobile telephone.

In another illustrative embodiment, the data structure further comprises a second data structure field 304 for containing data indicative of advertising characterization data for the advertising data stored in the first data structure field. The advertising characterization data is created at the end user device or at an IPTV server, by analyzing the advertising data in the first video data stream. The first video data stream or a multitude of first video data streams are analyzed to determine advertising characterization data from video, imagery, text and audio data in the advertising data. The advertising characterization data is correlated with end user profile data stored in the data base in a third data structure field 306. The end user profile data describes the end user or multiple end users associated with the end user device. The end user profile data includes but is not limited to subscriber activity data indicating purchasing habits, topical viewing interests (sports, fashion, leisure, food, new, shopping, etc.) for each individual end user(s) associated with an end user device. In another embodiment, a fourth data structure field 308 is provided for containing data indicative of video characterization data. The video characterization data describes video content that is currently being viewed or is scheduled to be viewed at the end user device. The video characterization data, the end user profile data and the advertising characterization data are correlated together to form a correlative index for each advertising data item in the data base. An advertising data item having a highest correlative index is selected and presented at the end user device during presentation of the second video data stream. A fifth data structure field 310 is provided for containing data indicative of a correlative index for the correlation of the video characterization data, the end user profile data and the advertising characterization data. A sixth data structure field 312 is provided for containing data indicative of a monitoring script data for the harvesting of the harvested advertising data.

Figure 4:
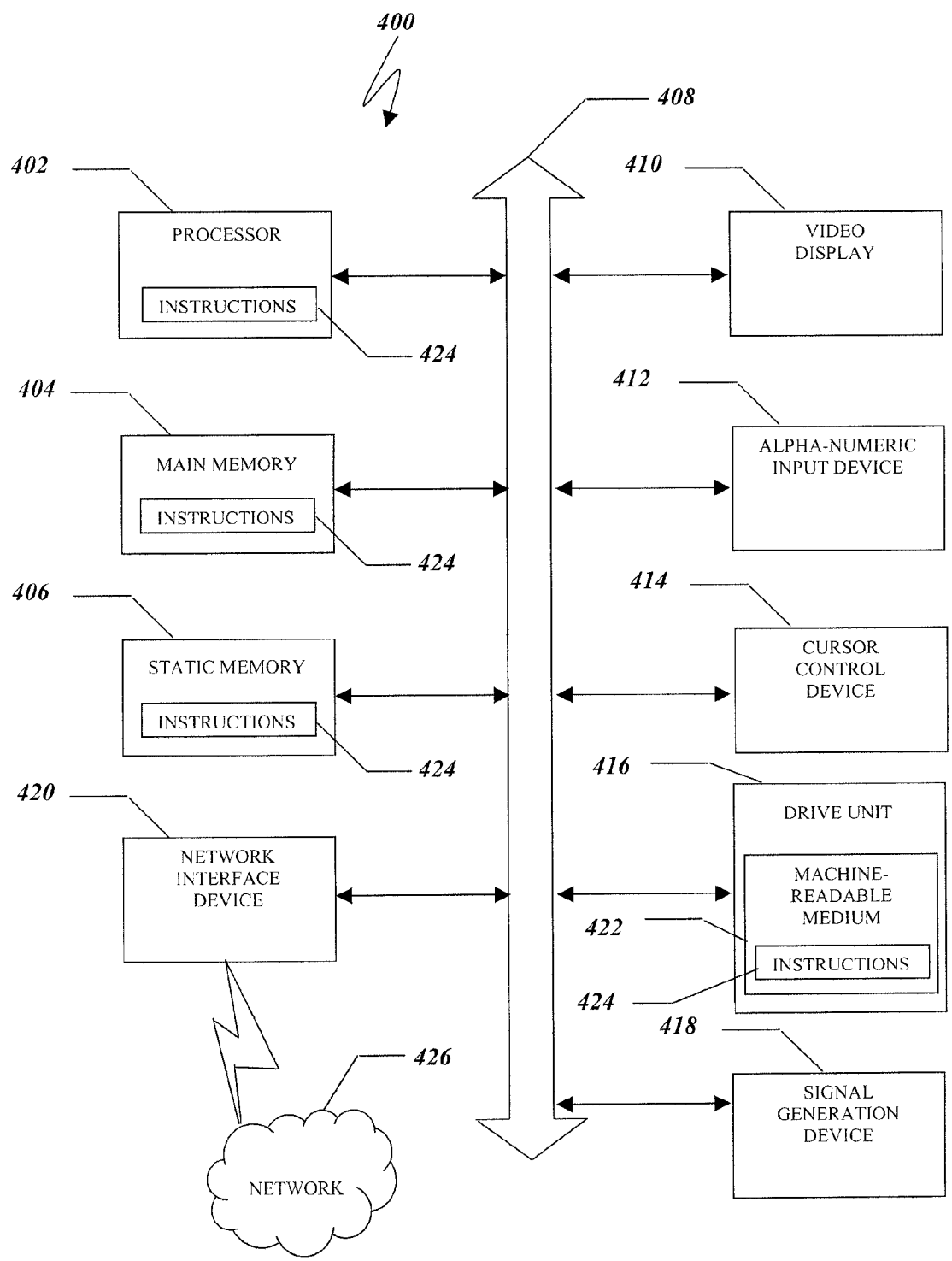
FIG. 4 is an illustrative embodiment of a machine for performing functions disclosed in an illustrative embodiment.

FIG. 4 is a diagrammatic representation of a machine in the form of a computer system 400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., liquid crystals display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420. The machine readable medium may also contain a data structure for containing data useful in providing a functional relationship between the data and a machine or computer in an illustrative embodiment of the disclosed system and method.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tangible non-transitory computer readable medium containing a computer program comprising computer instructions executable by a computer the computer program comprising:
   instructions to receive, at an end user device, targeted advertising data items wherein the targeted advertising data items are targeted to an end user at the end user device and a monitoring script comprising monitoring script data indicating a plurality of original broadcast video data streams to monitor and original broadcast times for monitoring the targeted advertising data items during the original broadcast time embedded in the plurality of video streams during the original broadcast time;
   instructions to monitor and store the targeted advertising data items from the plurality of video streams during the original broadcast time, at the end user device in accordance with the monitoring script data when the end user device is not presenting a video data stream;
   instructions to correlate advertising characterization data for the plurality of targeted advertising data items with video characterization data for a currently viewed program at the end user device with end user profile data for the end user at the end user device; and
   instructions to select based on the correlating, at least one of the plurality of targeted advertising data items for presentation to the end user during display of the currently viewed program at the end user device.

2. The medium of claim 1, wherein the plurality of original broadcast video data streams are received from an internet protocol television system.

3. The medium of claim 1, the computer program further comprising:
   instructions to correlate the advertising characterization data, end user profile and video characterization data for the currently viewed program wherein the advertising data items are categorized by a correlative index based on the correlating and stored in a data base at the end user device.

4. The medium of claim 2, wherein the instructions to monitor further comprise instructions to monitor video channels at prescribed times defined in the monitoring script at the end user device.

5. The medium of claim 1, wherein the end user device is set top box.

6. The medium of claim 1, wherein the advertising characterization data is subsonic audio data.

7. The medium of claim 1, wherein the one of the plurality of advertising data item is removed from the data base at the end user device after being presented a predetermined number of times at a plurality of end user devices.

8. The medium of claim7, the computer program further comprising:
   instructions to report from the end user device, a selection of the advertising data for presentation during the currently viewed program.

9. A system for selecting advertising data at an end user device comprising:
   a processor in data communication with a tangible computer readable storage medium;
   a computer program stored in the computer readable medium, the computer program comprising:
   instructions to receive, at an end user device, targeted advertising data items wherein the targeted advertising data items are targeted to an end user at the end user device and a monitoring script comprising monitoring script data indicating a plurality of original broadcast video data streams to monitor and original broadcast times for monitoring the targeted advertising data items during the original broadcast time embedded in the plurality of video streams during the original broadcast time;
   instructions to monitor and store the targeted advertising data items from the plurality of video streams during the original broadcast time, at the end user device in accordance with the monitoring script data when the end user device is not presenting a video data stream;
   instructions to correlate advertising characterization data for the plurality of targeted advertising data items with video characterization data for a currently viewed program at the end user device with end user profile data for the end user at the end user device; and
   instructions to select based on the correlating, at least one of the plurality of targeted advertising data items for presentation to the end user during display of the currently viewed program at the end user device.

10. The system and claim 9, wherein the plurality of video data streams received from an internet protocol television system.

11. The system of claim 9, the computer program further comprising instructions to correlate the advertising characterization data, end user profile and video characterization data for the currently viewed program wherein the advertising data items are categorized by a correlative index based on the correlating and are stored in a data base at the end user device.

12. The system of claim 10, wherein the instructions to monitor further comprises instruction too monitor video channels at prescribed times defined in the monitoring script at the end user device.

13. The system of claim 9, wherein the end user device is a device is one of a set top box, a mobile phone, a personal computer and a digital video recorder.

14. The system of claim 10, wherein the advertising characterization data are black frames.

15. The system of claim 11, wherein the one of the plurality of advertising data items is removed from the data base at the end user device after being presented at a predetermined number of times at end user devices.

16. The system of claim 15, the computer program further comprising instructions to report from the end user device, a selection of the advertising data for presentation during the currently viewed program.

17. A data structure embedded in a non-transitory computer readable storage medium for containing data used by an end user processor for presenting advertising data, the data structure comprising:

a first field for storing data indicating a monitoring script comprising times and a plurality of original broadcast video data stream containing targeted advertising data targeted to an end user at the end user device, to be monitored during the original broadcast times at the end user device while the end user device is not presenting a video data stream to the end user for use by a processor;

a second field for storing data indicative of harvested advertising data monitored in accordance with the monitoring script during the original broadcast times during idle times while the end user device in not presenting a video stream;

a third field for storing data indicative of a correlation index based on correlating advertising characterization data for the advertising data item with end user profile data for an end user at the end user device; and a fourth field for storing data indicative of an advertising data item selected based on the correlation index for at least one of the plurality of advertising data items for presentation during display of a second video data stream at the end user device.

18. The data structure of claim 17, the data further comprising: a fifth field for storing data indicative of advertising characterization data describing the harvested advertising data.

19. The data structure of claim 18, the data structure further comprising:

a sixth field for storing data indicative of video characterization data for a currently viewed program; and a seventh field for storing data indicative of an end user profile.

20. The data structure of claim 19, the data structure further comprising:

an eighth field for containing data indicating a correlative index for a correlation between the advertising characterization data, the video characterization data and the end user profile data.

* * * * *